(12) United States Patent
Bachu et al.

(10) Patent No.: US 10,417,255 B2
(45) Date of Patent: *Sep. 17, 2019

(54) METADATA RECONCILIATION

(71) Applicant: EMC IP Holding Company LLC, Hopkinton, MA (US)

(72) Inventors: Kiran K. Bachu, Cupertino, CA (US); Seema Parveen, Cupertino, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 342 days.

This patent is subject to a terminal disclaimer.

(21) Appl. No.: 15/246,125

(22) Filed: Aug. 24, 2016

(65) Prior Publication Data

US 2017/0046418 A1    Feb. 16, 2017

Related U.S. Application Data

(63) Continuation of application No. 13/931,501, filed on Jun. 18, 2013, now Pat. No. 9,454,549.

(51) Int. Cl.
*G06F 16/00* (2019.01)
*G06F 16/27* (2019.01)
(Continued)

(52) U.S. Cl.
CPC ........ *G06F 16/273* (2019.01); *G06F 11/1448* (2013.01); *G06F 11/1451* (2013.01);
(Continued)

(58) Field of Classification Search
CPC ............. G06F 11/1464; G06F 11/1451; G06F 11/1469; G06F 2201/84; G06F 3/0619; G06F 3/065; G06F 17/30424; G06F 17/30554; G06F 17/30575; G06F 17/30867; G06F 17/30997; G06F 11/1461; G06F 17/30073; G06F 17/30106; G06F 11/1453; G06F 11/1458; G06F 17/30115; G06F 17/30126; G06F 17/30174; G06F 17/3053; G06F 11/1446; G06F 11/1456; G06F 11/2094; G06F 11/1435; G06F 11/1448; G06F 17/30091; G06F 17/30607; G06F 11/1425; G06F 11/1658; G06F 17/211; G06F 17/22; G06F 17/30017; G06F 17/301; G06F 17/30112; G06F 17/30206; G06F 17/30253; G06F 17/30268; G06F 17/30327; G06F 17/30525; G06F 17/30598; G06F 17/30705; G06F 2201/80; G06F 3/04817; G06F 3/04842; G06F 3/067; G06F 3/0689; G06F 11/2028; G06F 11/203;
(Continued)

(56) References Cited

U.S. PATENT DOCUMENTS 8,219,769 B1    7/2012 Wilk
8,261,282 B1    9/2012 Ponnapur
(Continued)

*Primary Examiner* — Yicun Wu
(74) *Attorney, Agent, or Firm* — Van Pelt, Yi & James LLP

(57) ABSTRACT

Reconciling data is disclosed. It is determined whether a state of a first backup application is consistent with a state of a second backup application. In the event the state of the first backup application is not consistent with the state of the second backup application, the state of the first backup application is updated to be consistent with the state of the second backup application.

30 Claims, 3 Drawing Sheets

(51) Int. Cl.
*G06F 16/23* (2019.01)
*G06F 11/14* (2006.01)
*G06F 16/188* (2019.01)
*G06F 16/182* (2019.01)

(52) U.S. Cl.
CPC ........ *G06F 11/1458* (2013.01); *G06F 16/184* (2019.01); *G06F 16/188* (2019.01); *G06F 16/2365* (2019.01); *G06F 2201/80* (2013.01); *G06F 2201/805* (2013.01); *G06F 2201/815* (2013.01); *G06F 2201/82* (2013.01)

(58) Field of Classification Search
CPC ............. G06F 11/2097; G06F 12/1425; G06F 17/30082; G06F 17/3012; G06F 17/30212; G06F 17/30233; G06F 17/30321; G06F 17/30477; G06F 17/30489; G06F 17/30882; G06F 17/30911; G06F 2201/805; G06F 2201/82; G06F 2212/1052; G06F 11/143; G06F 11/1662; G06F 17/30076; G06F 17/30176; G06F 17/30194; G06F 3/0653; G06F 8/65; G06F 8/656; G06F 11/00; G06F 11/2069; G06F 17/30; G06F 17/30144; G06F 17/30368; G06F 17/30578; G06F 17/30581; G06F 17/30584; G06F 2201/85; G06F 8/44; G06F 9/54; G06F 11/1076; G06F 11/1092; G06F 11/1412; G06F 11/1415; G06F 11/1441; G06F 11/1466; G06F 11/1484; G06F 11/202; G06F 11/2058; G06F 11/2071; G06F 11/2082; G06F 11/2092; G06F 11/3034; G06F 17/30097; G06F 17/30203; G06F 17/30312; G06F 2211/1057; G06F 3/0646; G06F 3/0647; G06F 3/0665; G06F 3/0683; G06F 8/60; G06F 8/61; G06F 9/38; G06F 11/0769; G06F 11/2041; G06F 11/2046; G06F 11/2048; G06F 11/2056; G06F 11/2064; G06F 11/2076; G06F 11/2089; G06F 17/30008; G06F 17/30067; G06F 17/30088; G06F 17/30156; G06F 17/30171; G06F 17/30215; G06F 17/30244; G06F 17/3028; G06F 17/30289; G06F 17/30309; G06F 17/3033; G06F 17/30342; G06F 17/30348; G06F 17/30351; G06F 17/30353; G06F 17/30356; G06F 17/30359; G06F 17/30362; G06F 17/30371; G06F 17/30383; G06F 17/30415; G06F 17/30427; G06F 17/30436; G06F 17/30463; G06F 17/30533; G06F 17/30557; G06F 17/3056; G06F 17/30566; G06F 17/30592; G06F 17/30604; G06F 17/30722; G06F 17/3082; G06F 17/30943; G06F 2009/45583; G06F 21/577; G06F 21/6218; G06F 2201/835; G06F 2201/855; G06F 3/0611; G06F 3/0617

See application file for complete search history.

(56) References Cited

U.S. PATENT DOCUMENTS

| | | | |
|---|---|---|---|
| 8,413,146 | B1 | 4/2013 | McCorkendale |
| 8,661,184 | B2 * | 2/2014 | Wood .................. G06F 12/0246 711/100 |
| 8,671,406 | B1 | 3/2014 | Gopal |
| 8,819,369 | B1 | 8/2014 | Alappat |
| 8,892,706 | B1 | 11/2014 | Dalal |
| 8,966,318 | B1 | 2/2015 | Shah |
| 9,003,139 | B1 | 4/2015 | Shivdeo |
| 9,020,895 | B1 | 4/2015 | Rajashekar |
| 9,037,547 | B1 | 5/2015 | Shivdeo |
| 9,354,907 | B1 | 5/2016 | Teli |
| 9,424,136 | B1 | 8/2016 | Teater |
| 9,697,093 | B2 | 7/2017 | Jorapurkar |
| 2009/0313447 | A1 | 12/2009 | Nguyen |
| 2010/0262585 | A1 | 10/2010 | Rosikiewicz |
| 2010/0332657 | A1 | 12/2010 | Elyashev |
| 2011/0022694 | A1 | 1/2011 | Dalal |
| 2011/0029486 | A1 * | 2/2011 | Pivowar .............. G06F 17/3048 707/634 |
| 2011/0087874 | A1 | 4/2011 | Timashev |
| 2012/0017114 | A1 | 1/2012 | Timashev |
| 2012/0072685 | A1 | 3/2012 | Otani |
| 2012/0117212 | A1 | 5/2012 | Fries |
| 2013/0019240 | A1 | 1/2013 | Tsirkin |
| 2013/0036328 | A1 | 2/2013 | Mutisya |
| 2013/0081013 | A1 | 3/2013 | Plondke |
| 2013/0262390 | A1 | 10/2013 | Kumarasamy |
| 2013/0262801 | A1 | 10/2013 | Sancheti |
| 2013/0297964 | A1 | 11/2013 | Hegdal |
| 2014/0095816 | A1 | 4/2014 | Hsu |
| 2014/0173594 | A1 | 6/2014 | Ng |
| 2014/0181813 | A1 | 6/2014 | Deshpande |
| 2014/0201737 | A1 | 7/2014 | Mitkar |

* cited by examiner

METADATA RECONCILIATION

CROSS REFERENCE TO OTHER APPLICATIONS

This application is a continuation of co-pending U.S. patent application Ser. No. 13/931,501 entitled METADATA RECONCILIATION filed Jun. 28, 2013 which is incorporated herein by reference for all purposes

BACKGROUND OF THE INVENTION

Often in large scale IT environments, a backup of data may be managed or performed by multiple backup applications. For example, one backup application may manage and perform backup of one set of data while another backup application may manage and perform backup of a different set of data. The activities and data of different backup applications may be required to be synchronized. This may be especially true if the backup applications manage and backup overlapping data sets. However, over time, the backup applications may become unsynchronized due to conditions such as application error or network error. Therefore, there exists a need for a way to better synchronize different backup applications.

BRIEF DESCRIPTION OF THE DRAWINGS

Various embodiments of the invention are disclosed in the following detailed description and the accompanying drawings.

DETAILED DESCRIPTION

Figure 1:
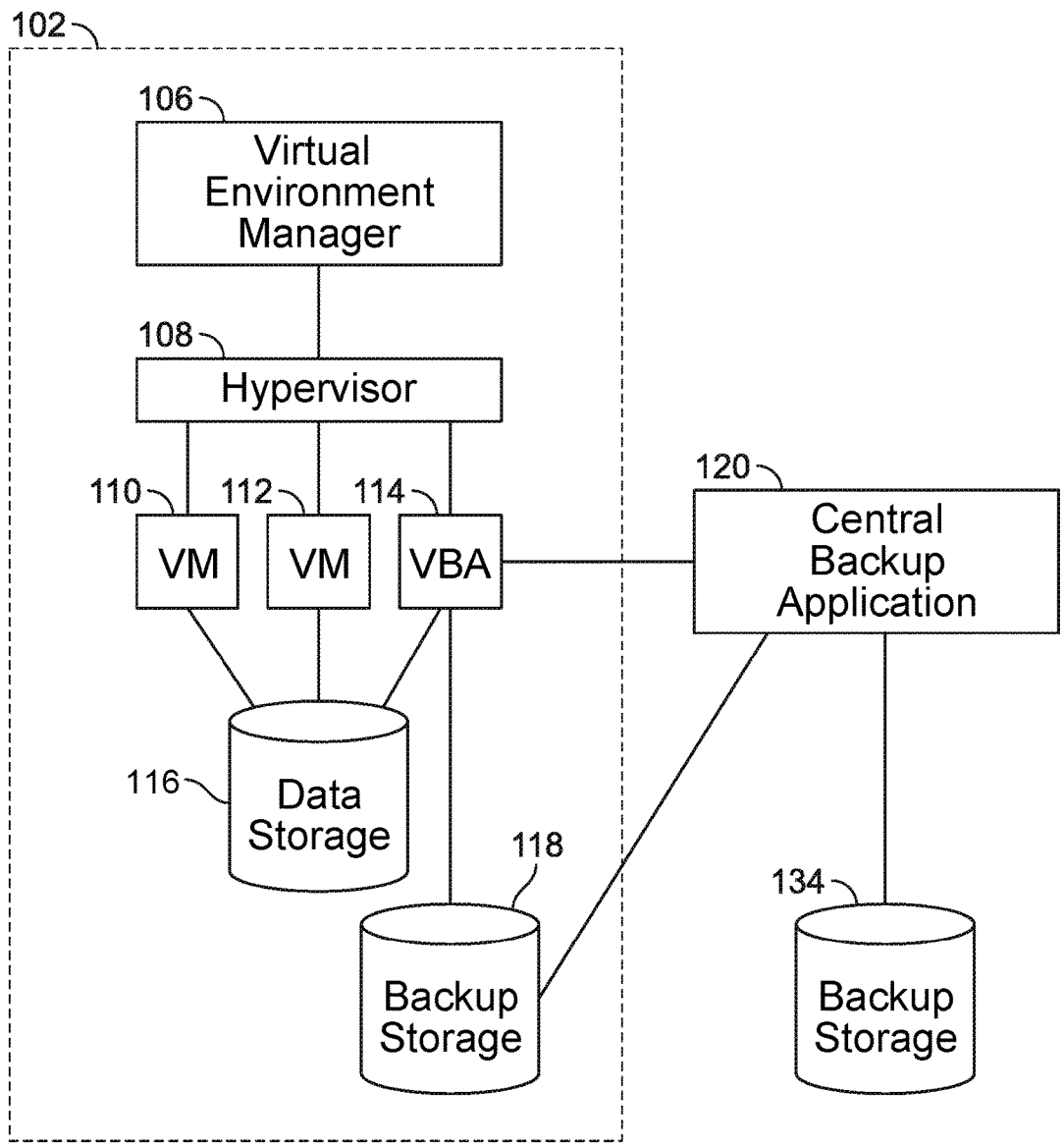
FIG. 1 is a block diagram illustrating an embodiment of a virtual computing and backup environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Reconciling backup application states is disclosed. In some embodiments, it is determined whether a state of a first backup application is consistent with a state of a second backup application. Examples of the state include a metadata/catalog and configuration data of the backup application. In some embodiments, the second backup application manages the first backup application. The first backup application may coordinate backup of a virtual environment. The first backup application may be managed using a virtual environment management platform. In the event the state of the first backup application is not consistent with the state of the second backup application, the state of the first backup application is updated to be consistent with the state of the second backup application. In some embodiments, in the event a change to the state of the first backup application to update the state of the first backup application corresponds to an inconsistency in a backup data repository of the first backup application, the backup data repository of the first backup application is updated to be consistent with the change.

FIG. 1 is a block diagram illustrating an embodiment of a virtual computing and backup environment. Site 102 includes a first virtual environment. Site 102 includes virtual environment manager 106. In some embodiments, virtual environment manager 106 manages a virtual computing environment. For example, virtual environment manager 106 offers a virtual computing environment management platform that can be used to view, configure, deploy, operate, modify, and/or backup a virtual computing environment. A user interface may be offered by virtual environment manager 106 to allow a user to manage the virtual computing environment. The virtual computing environment includes one or more virtual machines. An example of virtual environment manager 106 includes VMware vCenter™ offered by VMware, Inc. of Palo Alto, Calif. Virtual environment manager 106 is connected to hypervisor 108. Hypervisor 108 creates and operates VM (i.e., virtual machine) 110, VM 112, and virtual backup appliance 114. In some embodiments, hypervisor 108 includes an enterprise hypervisor for virtual servers that execute directly on host server hardware without requiring an additional underlying operating system. An example of hypervisor 108 includes VMware ESX and VMware ESXi of VMware, Inc. VM 110, VM 112, and VBA 114 may include a software-implemented abstraction of a hardware. For example, VM 110 and VM 112 each emulates a computer with its own operating system and application. VM 110 and VM 112 may each host a user application/service and/or a server application/service.

VBA 114 is a virtual backup appliance that performs data protection and/or backup of one or more components of the virtual computing environment of site 102. For example, VBA 114 performs backup of VM 110 and VM 112 to backup storage 118. In some embodiments, VBA 114 includes VMware Backup Appliance. In some embodiments, VBA 114 allows native format (e.g., image-based) backup and restore of virtual machines/components. Data storage 116 includes data of VM 110, VM 112, and/or VBA 114. For example, configuration data, operating data, production data, and/or implementation data of VM 110, VM 112 and/or VBA 114 may be stored in data storage 116. In some embodiments, in order to backup a virtual machine such as VM 110, VBA 114 learns about the existence and storage location of the virtual machine using virtual environment manager 106, hypervisor 108 and/or directly from VM 110, and directly accesses the data of the virtual machine to be backed up from data storage 116 to store the backup data to backup storage 118. In some embodiments, VBA 114 is deployed in the virtual computing environment of site 102. For example, VBA 114 is installed/deployed and managed using the virtual environment management platform of virtual environment manager 106. Data to be backed up using VBA 114 may be specified using a user interface of virtual environment manager 106 that controls VBA 114. VBA 114 stores backup data to backup storage 118. Backup storage 118 may perform de-duplication of stored data. An example of backup storage 118 includes EMC Data Domain® Deduplication storage and/or replicator of EMC Corporation of Hopkinton, Mass. VBA 114 may store backup data to other storage locations (e.g., database, tape, etc.).

In some embodiments, central backup application 120 manages data protection, recovery, and/or backup across one or more sites, virtual environments, IT environments, and/or data storage locations/devices. An example of central backup application 120 includes EMC NetWorker™ of EMC Corporation. In some embodiments, EMC NetWorker is a suite of enterprise level data protection software that unifies and automates backup to tape, disk-based, and flash-based storage media across physical and virtual environments for granular and disaster recovery. Cross-platform support is provided for many operating system environments and file systems. EMC NetWorker may manage data zones that contain clients/data to be backed up. The NetWorker management console may provide a graphic user interface for functions such as client configuration, policy settings, schedules, monitoring, reports, and daily operations for de-duplicated and non-de-duplicated backups. In some embodiments, central backup application 120 directly performs backup of data stored in a physical and/or virtual machine/server.

In some embodiments, central backup application 120 provides VBA 114 with one or more data protection policies. For example, VBA 114 may be deployed as a module that communicates and coordinates with central backup application 120 to allow a data protection administrator using central backup application 120 to access, monitor and control any number of VBAs. For example, a data protection policy may be provided to VBA 114 by central backup application 120 to allow a network administrator of site 102 to utilize the policy to backup data of site 102. A data protection policy may specify one or more of the following: how data is to be backed up, when a backup is to be performed, where and type of storage the backup data is to be stored, a retention period of the backup data, where the backup data is to be replicated, retention period(s) of replicated backup data, or which data is to be backed up. Central backup application 120 may be a part of site 102 and/or another site. Central backup application 120 may be hosted on a physical server and/or a virtual machine/appliance. Central backup application 120 may manage data protection of a plurality of sites and IT environments. In some embodiments, central backup application 120 manages replication of backup data stored in backup storage 118. For example, according to a backup policy, central backup application 120 manages/facilitates replication of at least a selected portion of contents of backup storage 118 to backup storage 134. Backup storage 134 may perform de-duplication of stored data. An example of backup storage 134 includes EMC Data Domain Deduplication storage and/or replicator of EMC Corporation. In some embodiments, backup storage 134 belongs to a site remote from site 102. In some embodiments, backup storage 134 is a backup storage of central backup application 120 and/or is managed by central backup application 120.

In some embodiments, VBA 114 and central backup application 120 each maintains its own metadata and configuration that is at least in part synchronized. For example, metadata about backup data stored in a backup storage (e.g., backup storage 118) is maintained by both VBA 114 and central backup application 120. Examples of synchronized configuration data includes specification of data protection policies, which data is to be backed up and protected, which backup storage/location is to be utilized to perform a backup for a particular protected data, and how and when a backup is to be performed for a particular protected data. In some embodiments, central backup application 120 instructs VBA 114 to perform a backup of a VM and/or other data of site 102. In some embodiments, when a backup or other action that modifies metadata or configuration data of VBA 114 is performed, a message is provided to central backup application 120 to inform of the change to allow central backup application 120 to update its state. In some embodiments, when an action that modifies metadata or configuration data of central backup application is performed, a message is provided to VBA 114 to inform of the change to allow VBA 114 to update its state. A synchronization communication protocol may be utilized to communicate between VBA 114 and central backup application 120.

In some embodiments, although attempts have been made to synchronize metadata and configuration data of VBA 114 and central backup application 120, the metadata and/or configuration data may become inconsistent over time. In some embodiments, reconciliation is performed by VBA 114 and/or central backup application 120 to reconcile the differences and synchronize the appropriate metadata and configuration data. The reconciliation may be performed on a periodic interval and/or dynamically as needed. In some embodiments, in the event a change to the state corresponds to an inconsistency in a backup data repository of the first backup application, the backup data repository correspondingly is updated to be consistent with the change.

The components shown in FIG. 1 may be implemented in one or more computers, servers, storage devices, networking components, and/or virtual components/networks. Connection between the components may include one or more of the following: a direct or indirect physical communication connection, mobile communication network, Internet, intranet, Local Area Network, Wide Area Network, Storage Area Network, and any other form of connecting two or more systems, components, or storage devices together. For example, site 102 and central backup application 120 may be connected together via a Wide Area Network. Other communication paths may exist and the example of FIG. 1 has been simplified to illustrate the example clearly. Although single instances of components have been shown to simplify the diagram, additional instances of any of the components shown in FIG. 1 may exist. For example, other instances of virtual machines, data stores, backup storages, VBAs, hypervisors, virtual environment managers, and central backup applications may exist. Components not shown in FIG. 1 may also exist.

Figure 2:
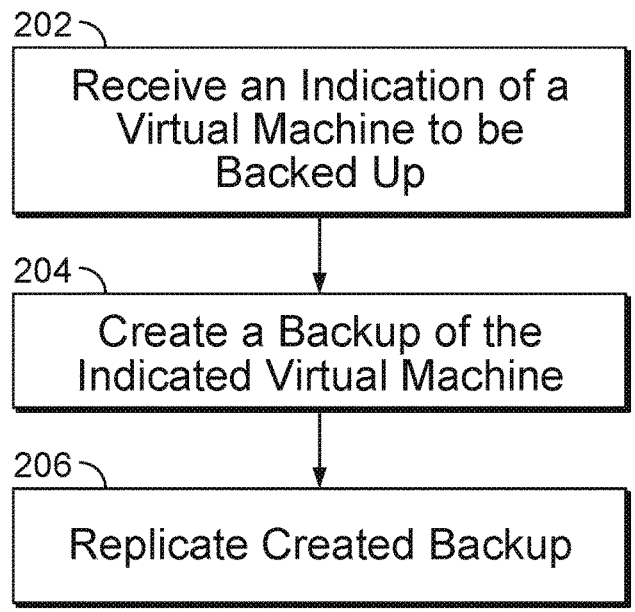
FIG. 2 is a flowchart illustrating an embodiment of a process for creating a backup of a virtual machine.

FIG. 2 is a flowchart illustrating an embodiment of a process for creating a backup of a virtual machine. In some embodiments, at least a portion of the process of FIG. 2 is implemented on central backup application 120 and/or VBA 114 of FIG. 1. In some embodiments, the process of FIG. 2 is performed periodically. For example, a data/virtual machine (VM) to be protected is periodically backed up based on a periodic interval determined based on a data protection policy. The data protection policy for a particular data/VM to be backed up may be specified by a user/administrator for a particular data/VM (e.g., using a user interface of virtual environment manager 106 of FIG. 1) and/or at least in part by a backup application such as central backup application 120 of FIG. 1. In some embodiments, at least a portion of the process of FIG. 2 is performed dynamically. For example, the process of FIG. 2 is performed when a dynamic determination (e.g., based on detection of change to data to be backed up since last backup) is made that a backup should be performed. In some embodiments, at least a portion of the process of FIG. 2 is performed when instructed by a central backup application such as central backup application 120 of FIG. 1.

At 202, an indication of a virtual machine to be backed up is received. In some embodiments, the indication is received via a user interface provided using virtual environment manager 106 of FIG. 1. For example, the indication is received via EMC Backup and Recovery User Interface of VMware vCenter. In some embodiments, the user interface allows a user/administrator to view VMs and virtual environment resources and devices in a hierarchical format (e.g., tree organization) and the user/administrator may graphically explore the hierarchical format to indicate the VM(s)/resources to be backed up. In some embodiments, the indication is associated with a data protection policy. In some embodiments, a selected policy among a plurality of data protection policies (e.g., among received policies from a central backup application such as central backup application 120 of FIG. 1) is selected for the data/VM to be backed up. For example, an administrator selects a selected policy (e.g., platinum policy) among types of available policies (e.g., silver policy—backup to local backup storage only, gold policy—backup to local backup storage and replicate backup to remote storage, platinum policy—backup to local backup storage and replicate to remote backup storage and tape backup) for the specified VM to be backed up. The indication may specify which data/VM to backup, which storage type(s)/locations to store the created backup, type of backup to be performed, when to perform the backup, a retention period of the backup data, where the backup data is to be replicated, a retention period(s) of replicated backup data, and/or any other indication associated with a data protection policy and/or performing a backup. In some embodiments, the indication of the virtual machine to backup is received at a VBA from a central backup application.

At 204, a backup of the indicated VM is created. In some embodiments, creating the backup includes storing at least a portion of data of the VM in a backup storage. In some embodiments, creating the backup includes storing an image of the VM in a backup storage (e.g., performing image-based backup). For example, although the existence and/or data storage location of the VM being backed up may be obtained via a virtual environment manager, hypervisor, and/or directly from the VM, an image of the VM is created from a data storage of the VM (e.g., image of VM 110 is created from data of VM 110 stored in data storage 116 of FIG. 1) without analyzing the contents of the VM (e.g., agent running inside VM is not used and/or contents of the VM is not received from the VM for backup) and the image is stored in a backup storage such as backup storage 118 of FIG. 1. In some embodiments, creating the backup includes storing a file of the VM in a backup storage (e.g., performing file-based backup). In some embodiments, creating the backup includes backing up the entire VM. In an alternative embodiment, only a portion of the VM is backed up. In some embodiments, creating the backup includes storing a backup of the VM in a native format of the VM.

In some embodiments, the backup is created by a VBA such as VBA 114 of FIG. 1. In some embodiments, by directly accessing data of a VM to be backed up from a data storage of the VM rather than via the VM, backup may be performed more efficiently with less processing required by the VM. In an alternative embodiment, creating the backup includes receiving content to be backed up from the VM. For example, guest space backup is performed by an agent running in the VM that provides content/files to be backed up. In some embodiments, creating the backup includes creating the backup according to the data protection policy associated with the VM to be backed up. For example, type(s) of backup storage(s) to be utilized, retention period of the backup data, whether to replicate the backup data to a remote site, retention period of the replicated backup, and/or frequency of the backup may be specified by an associated policy and the policy is followed when creating the backup.

In some embodiments, creating the backup includes communicating with a central backup application 120 (e.g., using a synchronization protocol) regarding the backup performed. For example, VBA 114 performs a backup of VM 110, and VBA 114 informs central backup application 120 regarding the backup (e.g., identification of content backed up, time/version of the backup, location of the backup, etc.) to allow central backup application 120 of FIG. 1 update its metadata/catalog of existing backup data and/or configuration data. VBA 114 may maintain a local catalog/metadata of existing backup data (e.g., updated when backup is performed) and/or configuration data and central backup application 120 may also maintain its own version of the catalog/metadata and/or configuration data that is synchronized with the local catalog/metadata and/or configuration data using indication provided by VBA 114 of FIG. 1. In some embodiments, the created backup is identified as a backup data belonging to a specific site where it was created. In some embodiments, the created backup may be stored at multiple backup storage locations such as a tape, a backup media, a database, and/or any other backup storage medium.

At 206, the created backup is replicated. In some embodiments, step 206 is optional and performed if the backed up VM/data is associated with a data protection policy that indicates the backup of the VM/data should be replicated. In some embodiments, replicating the backup data includes storing at least a portion of the created backup data in a secondary backup storage. The secondary backup storage may be located at a location remote from site 102 of FIG. 1. In some embodiments, replication of the backup data is performed by a central backup application (e.g., central backup application 120) by accessing backup storage directly from the source backup storage (e.g., backup storage 118) to replicate the backup data to another backup storage (e.g., backup storage 134 of FIG. 1). Performing the replication may include de-duplicating the backup (e.g., replicating only the portion of the backup that changed from a prior stored backup). In some embodiments, the replicating the backup includes replicating the backup to a plurality of other storage locations (e.g., to backup storage 134 of FIG. 1). In some embodiments, the replicated backup data is identified as a replicated copy.

Figure 3:
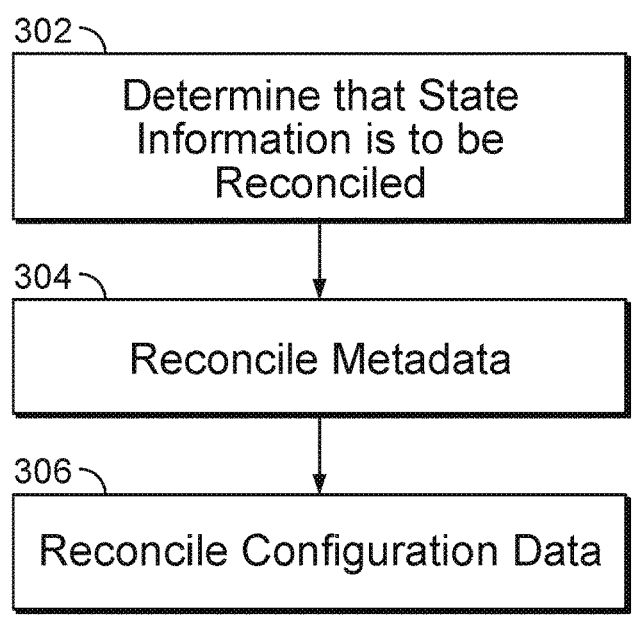
FIG. 3 is a flowchart illustrating an embodiment of a process for reconciling state information.

FIG. 3 is a flowchart illustrating an embodiment of a process for reconciling state information. In some embodiments, the process of FIG. 3 is implemented at least in part by central backup application 120 and/or VBA 114 of FIG. 1.

At 302, it is determined that state information is to be reconciled. In some embodiments, the state information is periodically reconciled on a predetermined and/or dynamically determined interval. In some embodiments, the state information is reconciled dynamically based on a determined need. For example, it is detected that the state information between two synchronized backup applications is not consistent. In some embodiments, it is determined that state information is to be reconciled when it is detected that a backup application has encountered an error, failed, and/or has been restored from a backup data of the backup application. For example, when a backup application encounters an error, the state of the backup application is restored from a checkpoint of the backup data of the state data and reconciliation with another synchronized backup application is indicated as needed. In some embodiments, reconciliation is manually requested by a user/administrator. In some embodiments, the reconciliation is performed in addition to a synchronization (e.g., synchronization performed at step 204 of FIG. 2) process. For example, the reconciliation is performed to detect and correct errors of the synchronization process and/or failure/error of a backup application.

At 304, metadata is reconciled. In some embodiments, reconciling metadata includes reconciling a catalog of backup data. For example, a catalog record listing of existing backup data stored in a backup storage of a first backup application (e.g., VBA 114 of FIG. 1) is compared with a corresponding catalog record listing of a second backup application (e.g., central backup application 120 of FIG. 1) and updated to be appropriately consistent. The metadata of two different backup applications to be reconciled may be in different formats, and comparing the metadata of backup applications includes translating the metadata to one or more comparable formats. In some embodiments, the metadata includes data about a stored backup data. For example, metadata includes data indicating which data is stored in a backup data, backup versioning information of a stored backup data, replication information about a stored backup data, a time associated with a backup data, retention policy associated with a backup data, and file information associated with a backup data. In some embodiments, reconciling the metadata includes updating a metadata of a slave backup application (e.g., VBA 114 of FIG. 1) to be consistent with a corresponding metadata data of a master backup application (e.g., central backup application 120 of FIG. 1). In some embodiments, reconciling the metadata includes updating a metadata of a master backup application to be consistent with a corresponding metadata data of a slave backup application. In some embodiments, a change to a metadata of one backup application to make it consistent with a metadata of another backup application may correspond to a change to a stored backup data. For example, a metadata update may indicate that a stored backup data is no longer to be stored, and the stored backup data is deleted to be consistent with the update.

At 306, configuration data is reconciled. In some embodiments, reconciling configuration data includes reconciling backup application configuration data. For example, configuration data indicated to be synchronized (e.g., configuration data of VBA 114 of FIG. 1) is compared with a corresponding configuration data of a second backup application (e.g., central backup application 120 of FIG. 1) and updated to be appropriately consistent. The configuration data of two different backup applications to be reconciled may be in different formats, so comparing the configuration data of backup applications includes translating the configuration data to one or more comparable formats. In some embodiments, the configuration data includes user and data protection policy configuration data. For example, the configuration data includes data indicating user/administrator data protection configuration, how a backup is to be performed, which data is to be protected and backed up, available backup policies, backup policies to be applied to specific data to be backed, when a backup is to be performed, which backup storage/location is to be utilized to store a backup data, and replication of backup data to be performed/maintained. In some embodiments, reconciling the configuration data includes updating a configuration data of a slave backup application (e.g., VBA 114 of FIG. 1) to be consistent with a corresponding configuration data of a master backup application (e.g., central backup application 120 of FIG. 1). In some embodiments, reconciling the configuration data includes updating a metadata of a master backup application to be consistent with a corresponding configuration data of a slave backup application.

Figure 4:
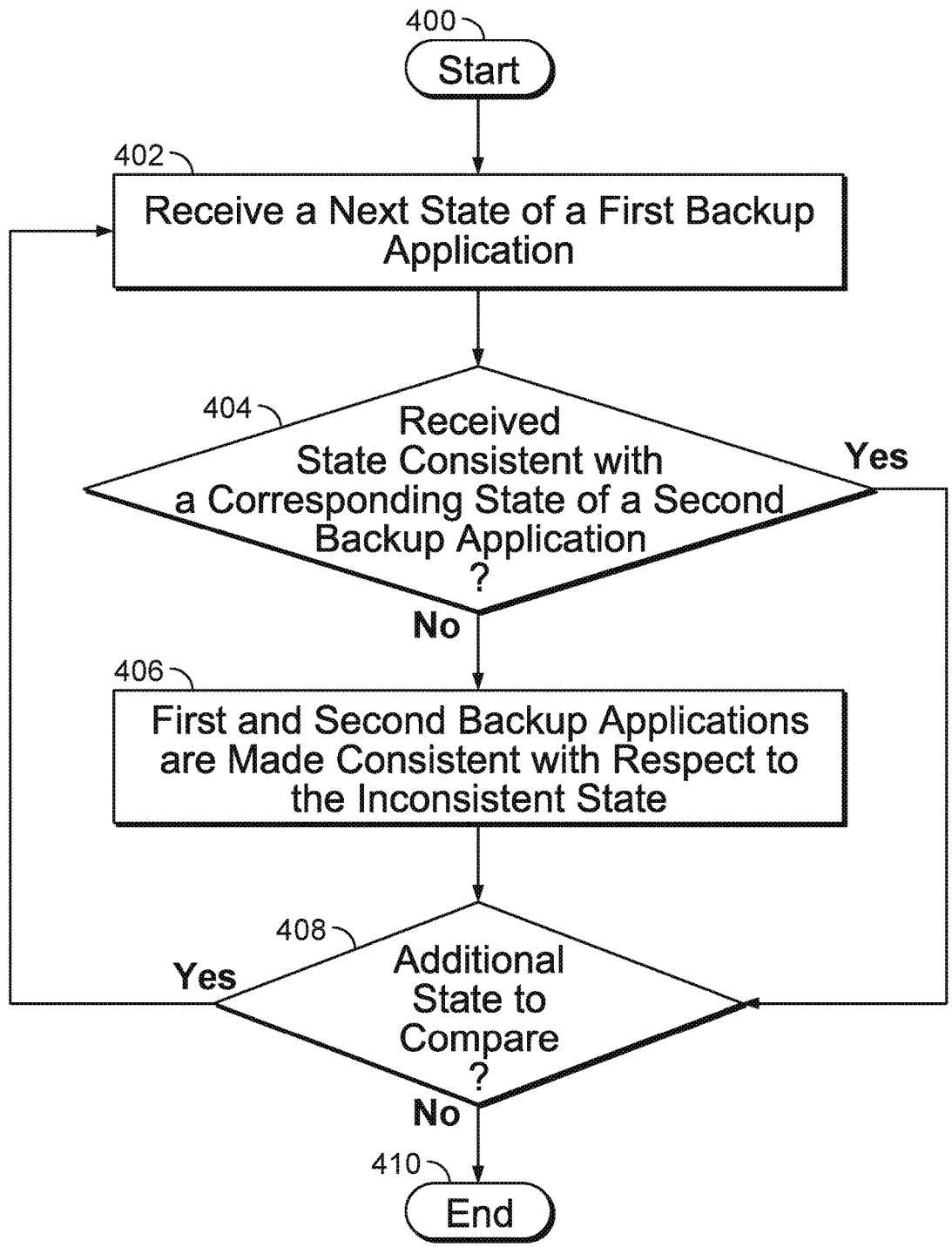
FIG. 4 is a flowchart illustrating an embodiment of a process for updating the state of a backup application.

FIG. 4 is a flowchart illustrating an embodiment of a process for updating the state of a backup application. In some embodiments, the process of FIG. 4 is implemented at least in part by central backup application 120 and/or VBA 114 of FIG. 1. In some embodiments, the process of FIG. 4 is included in step 304 and/or 306 of FIG. 3. The process begins at 400.

At 402, a next state entry of a first backup application is received. In some embodiments, the next state includes a first or next metadata entry and/or configuration data entry. For example, a data storage, a backup storage, a memory, a record, a list, a database, a file, a catalog, and/or any other storage or data structure storing metadata and/or configuration data is traversed to examine each metadata and/or configuration data entry for inconsistencies. Individual entries may be analyzed one at a time until all applicable entries have been analyzed. In an alternative embodiment, multiple metadata and/or configuration data entries may be analyzed/compared simultaneously. In some embodiments, the first backup application includes a VBA (e.g., VBA 114 of FIG. 1) or a slave backup application (e.g., a backup application that accepts commands from another master backup application). In some embodiments, the first backup application includes a central backup application (e.g., central backup application 120 of FIG. 1) or a master backup application (e.g., a backup application that provides commands from another slave backup application).

At 404, it is determined whether the received state entry is consistent with a corresponding state entry, if any, of a second backup application. Examples of the corresponding state entry include a metadata entry and a configuration data entry. In some embodiments, determining whether the received state entry is consistent includes attempting to locate a corresponding state entry in a data storage, a backup storage, a memory, a record, a list, a database, a file, a catalog, and/or any other storage or data structure that stores metadata and/or configuration data of the second backup application. In some embodiments, determining whether the received state entry is consistent includes determining whether the received state entry is included in the state of the second backup application. In some embodiments, determining whether the received state entry is consistent includes determining whether the received state entry is included in the state of the second backup application in a different form. In some embodiments, the second backup application includes a VBA (e.g., VBA 114 of FIG. 1) or a slave backup application (e.g., a backup application that accepts commands from another master backup application). In some embodiments, the second backup application includes a central backup application (e.g., central backup application 120 of FIG. 1) or a master backup application (e.g., a backup application that provides commands from another slave backup application).

In some embodiments, it is determined that the received state entry is not consistent if the received state entry is identified to be a state entry that should be consistent and a corresponding state entry cannot be found in the state of the second backup application or is different from the corresponding state entry of the second backup application. In some embodiments, it is determined that the received state entry is consistent if the received state entry is identified to be a state entry that does not need to be consistent. In some embodiments, it is determined that the received state entry is consistent if the received state entry is materially the same as the corresponding state entry of the second backup application. In some embodiments, determining whether the received state entry is consistent with a corresponding state entry includes comparing the state entries. In some embodiments, determining whether the received state entry is consistent with a corresponding state entry includes translating the received state entry (e.g., from a format native to the first backup application) to a format that can be used to determine its consistency with a corresponding state entry of the second backup application. In some embodiments, determining whether the received state entry is consistent with a corresponding state entry includes translating the corresponding state entry (e.g., from a format native to the second backup application) to a format that can be used to determine its consistency with the received state entry of the first backup application.

If at 404, it is determined that the received state entry is not consistent, at 406, the first and second backup applications are made consistent with respect to the inconsistent state. In some embodiments, the received state entry is added to a state of the secondary backup application to make the first and second backup applications consistent. In some embodiments, the received state entry is removed from a state of the first backup application to make the first and second backup applications consistent. In some embodiments, the received state entry is modified to be consistent with the corresponding state entry to make the first and second backup applications consistent. In some embodiments, the corresponding state entry is modified to be consistent with the received state entry to make the first and second backup applications consistent.

In some embodiments, a change to a state entry of one backup application to make it consistent with a state entry of another backup application may correspond to a change to a stored backup data. For example, a metadata update may indicate that a stored backup file is no longer to be stored, and the stored backup file is deleted to be consistent with the update. Due to a change to the state of a backup application, a corresponding entry of a backup storage may be added (e.g., using data received from the other backup application), removed, and/or modified (e.g., modified to be consistent with a corresponding data stored in a backup storage of the other backup application).

If at 404, it is determined that the received state entry is consistent or after step 406, at 408, it is determined whether an additional state entry to analyze exists. For example, it is determined whether another state entry to analyze for consistency is included in a data storage, a backup storage, a memory, a record, a list, a database, a file, a catalog, and/or any other storage or data structure storing metadata and/or configuration data of the first backup application. If at 408 it is determined that an additional state entry to analyze exists, the process returns to 402 where the next state entry is received. If at 408 it is determined that an additional state entry to analyze does not exist, the process ends at 410. In some embodiments, the process of FIG. 4 is first performed to compare state entries of the first application with the second application and performed again to compare state entries of the second application with the first application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for reconciling data, comprising:
a processor configured to:
determine whether a state of a first backup application is consistent with a state of a second backup application, wherein the state of the first backup application and the state of the second backup application are consistent with each other in the event first metadata and first configuration data associated with the first backup application is consistent with respective second metadata and second configuration data associated with the second backup application; and
in response to determining that the state of the first backup application is not consistent with the state of the second backup application, reconciling the state of the first backup application and the state of the second backup application with each other; and
a memory coupled with the processor and configured to provide the processor with instructions.

2. The system of claim 1, wherein the second backup application manages the first backup application.

3. The system of claim 1, wherein the first backup application coordinates backup of a virtual environment.

4. The system of claim 1, wherein the first backup application is managed using a virtual environment management platform.

5. The system of claim 4, wherein the virtual environment management platform includes VMware vCenter.

6. The system of claim 1, wherein in the event a change to the state of the first backup application to update the state of the first backup application corresponds to an inconsistency in a backup data repository of the first backup application, the backup data repository of the first backup application is updated to be consistent with the change.

7. The system of claim 1, wherein the first metadata includes metadata about a stored backup data.

8. The system of claim 1, wherein the first backup application informs the second backup application about a performed backup using a synchronization protocol.

9. The system of claim 1, wherein it is determined whether the state of the first backup application is consistent with the state of the second backup application in response to an indication that the first backup application has been restored to using a backup state.

10. The system of claim 1, wherein it is determined whether the state of the first backup application is consistent with the state of the second backup application in response to an indication from a user.

11. The system of claim 1, wherein determining whether the state of the first backup application is consistent with the state of the second backup application includes determining whether an entry of the state of the second backup application is included in the state of the first backup application.

12. The system of claim 1, wherein reconciling the state of the first backup application includes removing an entry in the state of the first backup application.

13. The system of claim 1, wherein reconciling the state of the first backup application includes adding an entry in the state of the first backup application.

14. The system of claim 1, wherein the first backup application includes a virtual backup appliance.

15. The system of claim 1, wherein the second backup application includes a master backup application.

16. The system of claim 1, wherein determining whether the state of the first backup application is consistent with the state of the second backup application includes translating a format of the state of the first backup application to a new format comparable with the state of the second backup application.

17. The system of claim 1, wherein the second backup application manages replication of backup data stored by the first backup application to a new storage location.

18. A method for reconciling data, comprising:
 determining whether a state of a first backup application is consistent with a state of a second backup application, wherein the state of the first backup application and the state of the second backup application are consistent with each other in the event first metadata and first configuration data associated with the first backup application is consistent with respective second metadata and second configuration data associated with the second backup application; and
 in response to determining that the state of the first backup application is not consistent with the state of the second backup application, reconciling the state of the first backup application and the state of the second backup application with each other.

19. The method of claim 18, wherein the second backup application manages the first backup application.

20. A computer program product for reconciling data, the computer program product being embodied in a tangible computer readable storage medium and comprising computer instructions for:
 determining whether a state of a first backup application is consistent with a state of a second backup application, wherein the state of the first backup application and the state of the second backup application are consistent with each other in the event first metadata and first configuration data associated with the first backup application is consistent with respective second metadata and second configuration data associated with the second backup application; and
 in response to determining that the state of the first backup application is not consistent with the state of the second backup application, reconciling the state of the first backup application and the state of the second backup application with each other.

21. The method of claim 18, wherein the second backup application manages the first backup application.

22. The method of claim 18, wherein in the event a change to the state of the first backup application to update the state of the first backup application corresponds to an inconsistency in a backup data repository of the first backup application, the backup data repository of the first backup application is updated to be consistent with the change.

23. The method of claim 18, wherein it is determined whether the state of the first backup application is consistent with the state of the second backup application in response to an indication that the first backup application has been restored to using a backup state.

24. The method of claim 18, wherein it is determined whether the state of the first backup application is consistent with the state of the second backup application in response to an indication from a user.

25. The method of claim 18, wherein reconciling the state of the first backup application includes at least one of: (1) removing an entry in the state of the first backup application and (2) adding an entry in the state of the first backup application.

26. The method of claim 18, wherein determining whether the state of the first backup application is consistent with the state of the second backup application includes translating a format of the state of the first backup application to a new format comparable with the state of the second backup application.

27. The method of claim 18, wherein the second backup application manages replication of backup data stored by the first backup application to a new storage location.

28. The computer program product of claim 20, wherein in the event a change to the state of the first backup application to update the state of the first backup application corresponds to an inconsistency in a backup data repository of the first backup application, the backup data repository of the first backup application is updated to be consistent with the change.

29. The computer program product of claim 20, wherein it is determined whether the state of the first backup application is consistent with the state of the second backup application in response to an indication that the first backup application has been restored to using a backup state.

30. The computer program product of claim 20, wherein reconciling the state of the first backup application includes at least one of: (1) removing an entry in the state of the first backup application and (2) adding an entry in the state of the first backup application.

* * * * *